Aug. 19, 1952     H. E. SIMI     2,607,433
BATTERY CARRIER
Filed July 15, 1946
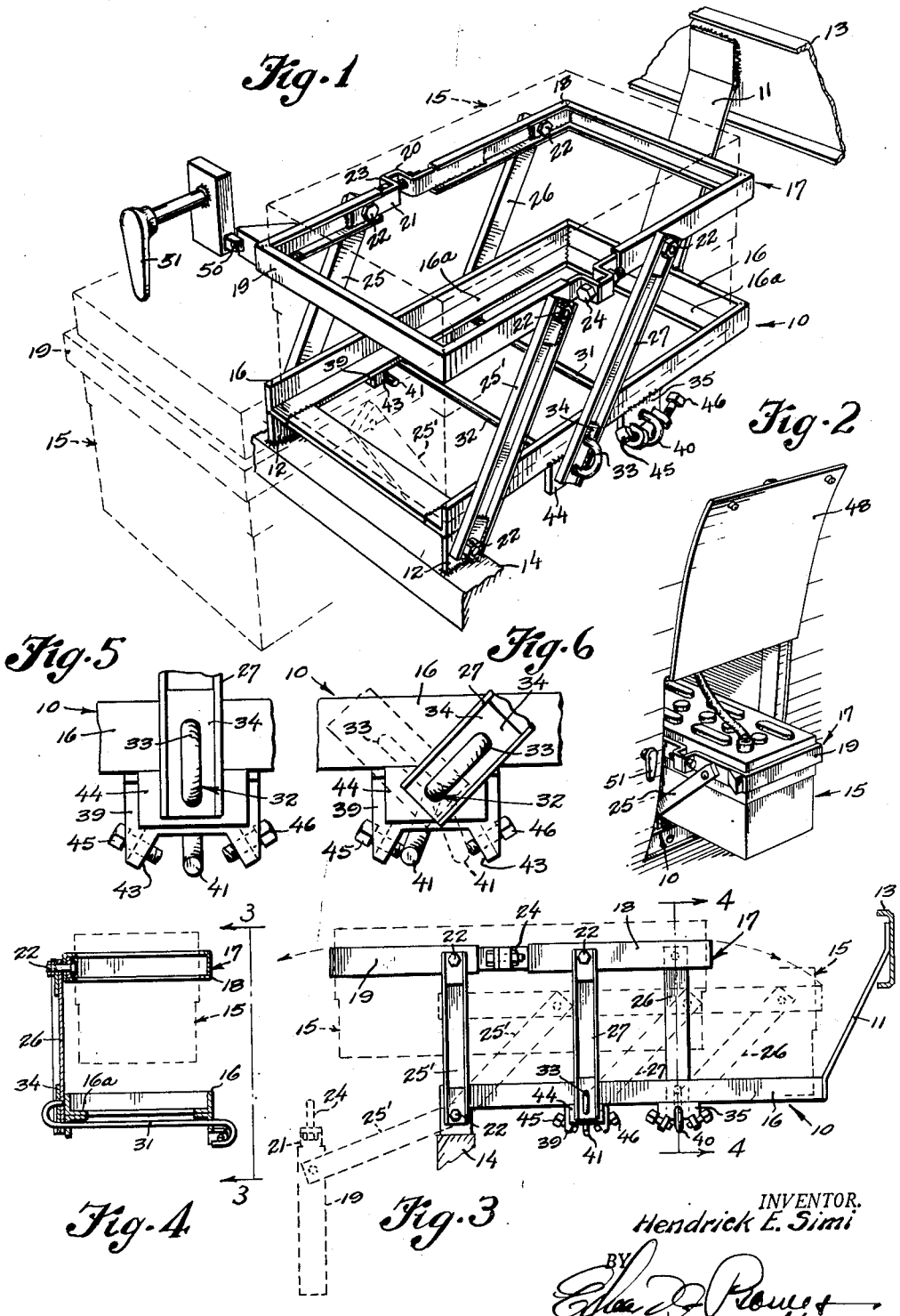
INVENTOR.
Hendrick E. Simi Patented Aug. 19, 1952

2,607,433

UNITED STATES PATENT OFFICE 2,607,433

BATTERY CARRIER

Hendrick E. Simi, Seattle, Wash., assignor to Kenworth Motor Truck Corporation, Seattle, Wash., a corporation of Washington Application July 15, 1946, Serial No. 683,739

6 Claims. (Cl. 180—68.5)

This invention relates to an improved transfer mechanism for moving the batteries of busses and the like into and from a receiving compartment therefor, and has for its general object to provide a mechanism of this nature which largely eliminates the manual labor heretofore associated with the handling of the heavy cases customarily employed as the source of reserve electrical energy for busses, trucks and the like demanding comparatively large capacity.

More specifically, it is a particular object of the present invention to devise a transfer mechanism including a severalty of control arms so associated with an improved vehicle mounting for the battery as to permit the battery to be swung into and from the compartment containing this mounting.

It is a still further and important object to provide a mechanism capable of being subjected to a torsional wind-up in consequence of the movement of the swinging arms into either of its two extremes of movement, and which thereafter permits this spring energy to be used in starting the arms with their sustained load of the battery case through a return swing.

A yet further object is to provide rugged means of the nature and for the purpose described which is simple and inexpensive to construct, which may be readily installed within the body or upon the frame of a bus or other vehicle, and which is particularly advantageous in that it permits the battery, under normal running conditions, to be situated in an out-of-the-way position while yet permitting the battery to be moved with ease and dispatch into a position readily accessible for replacement or service.

Other objects and advantages of my invention will be in part obvious and will in part appear from a consideration of the following description and appended claims, reference being had to the accompanying drawing, forming a part hereof.

In said drawing:

Figure 1 is a perspective view illustrating a battery-transfer mechanism for moving a battery into and from a receiving compartment therefor and constructed in accordance with the preferred embodiment of the present invention, the battery itself being shown by dotted lines and parts of the vehicle frame to which the stationary frame of the invention is attached being shown fragmentarily.

Fig. 2 is a fragmentary perspective view to a reduced scale showing the side of a bus body to which the invention is applied, and representing the battery as having been swung by said transfer mechanism into an exposed servicing position.

Fig. 3 is a side elevational view of the transfer mechanism shown in Fig. 1 but modified as to position, full lines in this view indicating the parts at the mid-point of their travel into and from a battery-receiving compartment, and dotted lines being employed to show such parts in the same positions in which they are shown by full lines in Fig. 1. The parts are viewed from the vantage point shown by lines 3—3 of Fig. 4. It may be here mentioned that there is included in the mechanism a fetter-like frame which surrounds the battery in the manner of a shackle, and which is composed of two complementing and detachably interconnected straps each having a U-shape when viewed in plan. Broken lines in this view portray the forward half of this shackle disconnected from the other or rear half and as having been moved into an inoperative position allowing ready insertion of the battery to or removal of the battery from the transfer mechanism.

Fig. 4 is a transverse vertical section on line 4—4 of Fig. 3.

Fig. 5 is a detail fragmentary side elevational view portraying one of the torsion rods used in the present invention, and showing the same as it appears when the battery has been moved by the transfer mechanism to a point midway between its two extremes of swinging travel; and Fig. 6 is a view similar to Fig. 5 excepting that the rod is here shown in a condition of torsional wind-up, and which occurs upon movement of the transfer mechanism to either extreme of its swinging travel.

Referring to the embodiment of the invention shown in the drawings, the reference numeral 10 indicates, in general, a substantially immovable battery-sustaining frame which is firmly attached to a suitable support, the said support comprising, say, the body of a bus or other automotive vehicle. The body is indicated as including in its framework a channel member 13 and a stringer member 14, and a bracket 11 and props 12 are shown as means for rigidly securing the battery-sustaining frame to this framework. It is self-evident that the invention is in no sense limited in its usage to a vehicle, nor in fact must the object supported be a battery.

The frame 10 is of a rectangular form generally conforming in its plan dimensions to the shape of the object to which it is applied, this object, as shown in the drawing, being a battery 15. In making up the frame, angle-iron structural members are by preference employed along the back and the two sides while a length of strap iron, applied flat, is carried across the front. Welding is employed to integrate the members, and the arrangement of the angle-irons is such that a horizontal web 16a of each structural piece is placed to underlie and form a rest for the battery. The strap iron is placed in a plane coinciding with that of the horizontal webs, while the upstanding elements 16 of the angle members embrace the two sides and the back of the battery along the bottom part of the latter.

The reference numeral 17 indicates, in general, a movable frame particularly constructed and arranged to shackle or embrace the battery case near the top thereof, for holding the case when it is moved from position to position in the manner more fully explained hereinafter. Describing this movable frame in greater detail and referring in particular to Fig. 1, the same is composed principally of two U-shaped members made up from channel-iron stock and extending, in each instance, across an end and a portion of the two sides of the battery. It will be seen by inspection of Fig. 1 that each of the members, denoted 18 and 19, possesses an extending connecting piece designated 20 and 21, respectively, which are so arranged as to constitute a coupling at each side of the movable frame by which to detachably connect the members 18 and 19 together. These members, more especially, may be drawn together as tightly as is necessary or desirable for securely gripping the battery. In the particular form of the invention illustrated, the connecting member 20 is provided with a reversely bent portion, and which is arranged to abut against an outwardly bent finger 23 of the connecting member 21, and the two pieces are drawn together by the nut and bolt assembly designated 24.

It should be particularly noted that the channel-shaped members 18 and 19 of the movable frame 17 are so positioned relative to the battery 15 that the web of the channel lies outermost, and this brings the edges of the flanged portions of the channeled members into contact with the battery. This improves the gripping action of the frame 17 since the edges of the members 18 and 19 are comparatively sharp. When inserting or removing a battery, the couplings are disconnected and the member 19 dropped into the position in which it is shown by dotted lines in Fig. 3.

The reference numerals 25, 25', 26 and 27 designate arms of a parallel linkage swingably supporting the movable frame 17 from the fixed frame 10, and these swingable connecting links are pivotally attached at each end to the frame 17 and to the frame 10, respectively. In making this attachment, pivot pins, as 22, are applied to the top and bottom of the forwardly placed arms 25 and 25', and also to the upper ends of the rearwardly placed arms 26 and 27, but the pivots for the lower ends of the latter are in the nature of torsion rods, hereinafter to be described, extending the full width of the frame 10. These rearwardly placed arms, for the purpose which will also be hereinafter made apparent, are longitudinally offset, and which is to say that one arm lies in closer proximity to the rear end of the frame than the other said arm, without, however, disturbing their parallelism.

Reference numerals 31 and 32 indicate the torsion rods, and these rods extend transversely across the frame 10 with the rod 31 being associated with the swingable member 26 and the rod 32 being associated with the swingable member 27. The torsion rods are each supported by a respective pair of transversely aligned plates which depend as fixed adjuncts from the stationary frame 10 and in the instance of the rod 32 these paired plates are indicated by 39 and 44. Only one of the other two plates, and which I designate 35, is visible in the principal views of the drawing. Each of the rods 31 and 32 extends through aligned openings in its pair of plates and as a consequence is simply and effectively held in place, but is permitted to rotate with respect to the plates and to the frame 10.

Each of the rods 31 and 32 possesses a generally upwardly extending reversely bent or hooked end, and this end I denote by 33 for the rod 32. The upwardly hooked end of the rod 31 is not shown in Fig. 1 of the drawings but is similar in structure to such end 33, being placed, however, to occupy a position at the opposite side of the frame. These upwardly hooked ends extend, in the manner clearly shown in Fig. 4, into a mating opening in a plate 34 which overlies and is made an integral part of the related swinging arm 26 or 27, as the case may be.

The other end of each of the torsion rods 31 and 32 is also hooked or curved but in the opposite direction to the aforedescribed hook or bend, hence being turned downwardly, and such downwardly extending hooked ends, denoted 40 and 41, project into a cut-out portion of the adjacent depending plate supporting the rod. Thus for the rod 32, the hooked end 41 extends into a cut-out portion 43 of the plate 39, and the hooked end 40 of the rod 31 extends into an identical cut-out portion in the plate 35. Indicated at 45 and 46 for each said cut-out are set-screws which permit the travel span of the downwardly hooked ends of the torsion rods to be adjusted. These set-screws can be dispensed with if desired inasmuch as the proper travel span can be readily arrived at through experiment and the cut-out sized accordingly.

The operation of the invention will be now described. Let it be presupposed that the battery 15 has been inserted in its carrying frame 17. As pointed out hereinbefore, this may be easily accomplished by removing the nutted bolts 24 to disengage the members 18 and 19, and thus allowing the latter to be dropped into the position shown by dotted lines in Fig. 3. The battery can be then slid onto the floor elements 16a of the frame 10, and frame pieces 18 and 19 again reassembled and secured upon the battery walls. With the battery thus held within the frame 17 and resting on the fixed frame 10, the various parts of the apparatus assume the positions shown in Fig. 1. The swingable members or links 25, 25', 26 and 27 are inclined rearwardly, that is, in the general direction of the bracket 11 and are so constructed and arranged that when thus positioned the bottom of the battery 15 rests upon the floor of the frame 10.

When the battery is in this position, the torsion rods 31 and 32 will have been twisted (see Fig. 6) and therefore are in a state of stress. Taking the torsion rod 32 as a specific example for purposes of description, it will be noted that when the battery 15 is in the position just described, the end 33 of the torsion rod 32 will have been forced to move with the movable arm 27, since it is attached thereto. However, the other end 41 of the rod 32 is restrained from free movement since it will have contacted the stop-screw 45 in course of its swing travel. The size of the cutout portion in the plate 39, into which the end 41 of the rod 32 extends, is carefully determined so that movement of the end 41 is interrupted a predetermined distance before the arm 27 reaches the end of its course of travel. Therefore when the arm 27 has completed its course of travel to position the battery 15 as shown in Fig. 1, it will have subjected the torsion rod 32 to a torsional wind-up. It will be understood that the torsion rod 31 also will have been simultaneously twisted in a corresponding degree. The consequence of this twisting is that the battery will have been cushioned at the end limit of its travel into the battery compartment. A latch mechanism comprising a bolt 50 and an operating handle 51 locks the battery within the compartment.

In view of the foregoing discussion of the action of the torsion rods 31 and 32, it will be readily appreciated that it is now possible for the torsion rods to assist in the movement of the battery 15 from its position shown in Fig. 1 to that shown in Fig. 2. In order to so move the battery, it is only necessary that the door 48 be opened and the latch disengaged from the frame 17. The suppressed spring load of the torsion rods will now assert itself and start the battery moving outwardly. It is necessary only that a very slight degree of manual labor be exerted to pull the spring-started battery over the hump, so to speak, and the torsion rods thereupon again take over to brake the battery as the latter moves into the exposed position shown in Fig. 2. It is to be understood that the torsion rods straighten out in the approach of the arms to upright or neutral position, and to be more exact, this occurs when the two curved ends of each rod become coplanar. Thereafter the downwardly curved ends 40 and 41 of each of the torsion rods will be free to move within its respective cutout portion until it again becomes interrupted by engagement with the stop-screw of the cut-out. During this interim movement of the downwardly curved ends of the torsion rods, the torsion rods neither resist nor further the movement of the connecting links and therefore of the battery 15. However, when said downwardly curved ends of the torsion rods again contact the stop-screws, the torsion rods are again twisted as the battery settles into the position shown in Fig. 2. Naturally such twisting of the torsion rods subjects them to stress and since they resist being stressed, the movement of the battery into its final position is opposed.

To reiterate, twisting of the torsion rods in the manner described serves a double purpose. It makes the descent of the battery into its new position more easy and smooth, thus lessening jarring contact between the battery and frame 10; and it also loads the torsion rods so that they are adapted to assist in the return of the battery to its former position. In view of the foregoing, it will be easily understood that the present retaining apparatus permits the battery to be moved with ease and without jarring contact at the end limits of travel from a recessed or out-of-the-way position, such as the one shown in Fig. 1, to an extended or accessible position, such as the one shown in Fig. 2, or vice versa.

While I have described my invention chiefly in connection with the embodiment thereof illustrated in the drawings, it will be understood that suitable variations and changes may be made. For instance, the particular vehicle chassis or body, together with the door and latching mechanism illustrated, is not necessarily the only installation with which the present retaining device is adapted for use. Accordingly, suitable attaching and supporting members may be devised by one skilled in the art in order to install the present retaining device in the particular machine or apparatus with which it is intended to be used. Furthermore, details of the present structure may be changed and still come within the scope of the present invention. In particular, the details of the battery-gripping members and movable frame 17 may be altered in a suitable way so as to permit insertion of the battery while nevertheless providing for firm retention thereof. However, the relatively simple means of accomplishing these ends which I have preferred to use has proved quite satisfactory.

Having illustrated and described my invention and having explained the principles thereof, it will be understood, nevertheless, that within the scope of the appended claims, the invention may be practised otherwise than specifically illustrated and described. Furthermore, the phraseology or terminology employed herein is for purposes of description and not of limitation; for it is not intended to limit the invention beyond the requirements of the prior art.

What I claim, is:

1. The combination with a platform arranged to sustain an object at two longitudinally spaced positions thereon, a carriage provided with means for detachably gripping the object and swingably mounted for reciprocal movement along an arcuate travel path the two extremes of which bring the gripped object into said platform-sustained positions, and means including a torsion spring operatively interconnected with the carriage and functionally inactive through the early stages of the carriage's movement in both directions of reciprocal travel while being subjected to a torsional wind-up yieldingly restraining the carriage against continued travel as the carriage nears either extreme of its reciprocal movement, the torsion spring being comprised of a torsion rod extending parallel to the swing axis of the carriage and operatively interconnected one end to the carriage and the other end to the platform, one of said connections being a fixed connection and the other said connection being a lost-motion connection.

2. The combination with a platform arranged to sustain an object thereon, a carriage provided with means for detachably gripping the object, a system of parallel links pivoted by one end to the platform and by the other end to the carriage and supporting the carriage for swinging movement through an arcuate path of travel one extreme of which brings the object to rest upon the platform, and a torsion rod placed co-axial to the swing axis of one of said links and operatively interconnected one end to the carriage and the other end to the platform, one of said connections being a fixed connection and the other said connection being a lost-motion connection with the lost-motion occurring through the intermediate stage of the carriage's swing-travel.

3. The combination with a platform arranged to sustain an object thereon, a carriage provided with means for detachably gripping the object, a system of parallel links pivoted by one end to the platform and by the other end to the carriage and supporting the carriage for swinging movement through an arcuate path of travel one extreme of which brings the object to rest upon the platform, and a torsion rod placed co-axial to the swing axis of one of said links and operatively interconnected one end to the carriage and the other end to the platform, one of said connections being a lost-motion connection with the lost motion occurring through the intermediate stage of the carriage's swing travel.

4. The combination with a platform arranged to sustain a battery case thereon, a carriage formed from complementary frame sections each of U-shaped plan configuration detachably connected one to the other and arranged when assembled to lie in opposing relation and clamp over opposite ends of the battery case, parallel links applied in sets of two, one set for one of said frame sections and the other set for the other frame section pivoted by one end of each to the platform and by the other end to the related frame section, the frame sections serving when assembled in secured relation upon the case to support the case for swinging movement through an arcuate path of travel one extreme of which brings the case to rest upon the platform, and a torsion rod placed co-axial to the swing axis of one of said links and operatively interconnected one end to the link and the other end to the platform, one of said connections being a fixed connection and the other said connection being a lost-motion connection with the lost motion occurring through the intermediate stage of the carriage's swing travel.

5. The combination with a platform arranged to sustain a battery case thereon, a carriage formed from complementary frame sections each of U-shaped plan configuration detachably connected one to the other and arranged when assembled to lie in opposing relation and clamp over opposite ends of the battery case, parallel links applied in sets of two, one set for one of said frame sections and the other set for the other frame section pivoted by one end of each to the platform and by the other end to the related frame section, the frame sections serving when assembled in secured relation upon the case to support the case for swinging movement through an arcuate path of travel one extreme of which brings the case to rest upon the platform, and a torsion rod placed co-axial to the swing axis of one of said links and provided with cranked end portions of which one said cranked end is firmly anchored to the related link and of which the other cranked end has a lost-motion connection comprising an arcuate slot formed in the platform to lie concentric to the torsion rod and into which said cranked end extends.

6. The combination with a platform arranged to sustain a battery case thereon, a carriage formed from complementary frame sections each of U-shaped plan configuration detachably connected one to the other and arranged when assembled to lie in opposing relation and clamp over opposite ends of the battery case, parallel links applied in sets of two, one set for one of said frame sections and the other set for the other frame section pivoted by one end of each to the platform and by the other end to the related frame section, the frame sections serving when assembled in secured relation upon the case to support the case for swinging movement through an arcuate path of travel one extreme of which brings the case to rest upon the platform, and respective torsion rods placed co-axial to the swing axis of the two links of one of said sets and each provided with cranked end portions of which one said cranked end has a lost-motion connection with the platform, the lost motion occurring through the intermediate stage of the carriage's swing travel, the two links to which said torsion rods are related being longitudinally offset from one another.

HENDRICK E. SIMI.

REFERENCES CITED

The following references are of record in the file of this patent:

UNITED STATES PATENTS

| Number | Name | Date |
|---|---|---|
| 442,658 | Bancroft | Dec. 16, 1890 |
| 474,831 | Hull | May 17, 1892 |
| 621,051 | Fest | Mar. 14, 1899 |
| 1,529,032 | Meisner et al. | Mar. 10, 1925 |
| 1,627,490 | Disibio | May 3, 1927 |
| 2,093,359 | Illmer | Sept. 14, 1937 |
| 2,216,663 | Fogle | Oct. 1, 1940 |
| 2,245,809 | Olley | June 17, 1941 |
| 2,348,640 | Oneal | May 9, 1944 |
| 2,360,056 | Heitshu | Oct. 10, 1944 |

FOREIGN PATENTS

| Number | Country | Date |
|---|---|---|
| 470,463 | Great Britain | Aug. 12, 1937 |